(12) United States Patent
Knoche et al.

(10) Patent No.: US 9,940,845 B2
(45) Date of Patent: Apr. 10, 2018

(54) ELECTRONIC HEALTHCARE EDUCATION SYSTEM AND METHOD

(71) Applicant: i-Human Patients, Inc., Mammoth Lakes, CA (US)

(72) Inventors: Craig Knoche, Mammoth Lakes, CA (US); Anne Knoche, Mammoth Lakes, CA (US)

(73) Assignee: i-Human Patients, Inc., Sunnyvale, CA (US)

(*) Notice: Subject to any disclaimer, the term of this patent is extended or adjusted under 35 U.S.C. 154(b) by 676 days.

(21) Appl. No.: 14/450,186

(22) Filed: Aug. 1, 2014

(65) Prior Publication Data

US 2014/0342333 A1 Nov. 20, 2014

Related U.S. Application Data

(63) Continuation-in-part of application No. 14/080,792, filed on Nov. 14, 2013, now abandoned.

(60) Provisional application No. 61/726,492, filed on Nov. 14, 2012, provisional application No. 61/726,494, filed on Nov. 14, 2012, provisional application No. 61/726,495, filed on Nov. 14, 2012, provisional application No. 61/726,497, filed on Nov. 14, 2012.

(51) Int. Cl.
*G09B 5/02* (2006.01)

(52) U.S. Cl.
CPC ........................... *G09B 5/02* (2013.01)

(58) Field of Classification Search
CPC ....................................................... G09B 5/02

USPC .......................................................... 434/267
See application file for complete search history.

(56) References Cited

U.S. PATENT DOCUMENTS

| 2008/0015418 A1* | 1/2008 | Jarrell | G06F 19/327 |
| | | | 600/300 |
| 2013/0041243 A1* | 2/2013 | Byrd | G06T 19/003 |
| | | | 600/374 |

* cited by examiner

*Primary Examiner* — Thomas Hong
(74) *Attorney, Agent, or Firm* — Invent Capture, LLC.; Samuel S. Cho

(57) ABSTRACT

A healthcare education software, which is executed by an electronic healthcare education system, incorporates a medical content authoring software platform with a medical authoring interface, a medical training, simulation, and evaluation software platform with a virtual patient examination simulator and an interactive prediction table, and a computerized medical causal concept diagram construction and evaluation software platform with corresponding interfaces for training of medical students and other healthcare professionals. Preferably, the healthcare education software is connected to a robust medical information database that contains a wealth of physiological simulation animation files, evidence-based patient diagnostic information, and other pertinent medical information, which can be readily imported and utilized by a healthcare education content creator in creating and updating medical training contents via the medial authoring interface. The healthcare education software may be executed on a CPU and a memory unit of a computer system, a portable device, or another electronic device.

11 Claims, 13 Drawing Sheets

A Virtual Patient Examination Simulator Interface Screenshot (e.g. Blood Pressure Assessment)

A Virtual Patient Examination Simulator Interface Screenshot (e.g. Ocular Motor Examination)
200

A Starting Interface Screenshot for Medical Causal Concept Diagram Construction
300

A Medical Causal Concept Diagram Construction Interface Screenshot
400

A Medical Causal Concept Diagram Evaluation Interface Screenshot
500

A Medical Causal Concept Diagram to Expert Diagram Comparison Interface Screenshot
600

A Medical Causal Concept Diagram Authoring Interface Screenshot for Healthcare Educational Authors
700

Another Medical Causal Concept Diagram Authoring Interface Screenshot for Healthcare Educational Authors

An Example of an Interactive Prediction Table Incorporating Physiological or Other Scientific Simulations An Example of an Interactive Prediction Table with User Entry of Prediction Before Physiological or Other Scientific Simulations An Example of Physiological or Other Scientific Simulation With Interactive Prediction Table in Observation Mode

Evaluation Output for Interactive Prediction Table with Physiological or Other Scientific Simulation

ELECTRONIC HEALTHCARE EDUCATION SYSTEM AND METHOD

INCORPORATION BY REFERENCE

A U.S. provisional patent application, U.S. 61/726,492, titled "Methods and Systems for Constructing Causal or Concept Diagrams in Cloud-Based Electronic Medical Education," and filed on Nov. 14, 2012, is incorporated herein by reference. The present invention also claims benefit to the U.S. provisional patent application, U.S. 61/726,492.

Furthermore, a U.S. provisional patent application, U.S. 61/726,494, titled "Prediction Table with Physiologic Simulation, Methods, and Systems," and filed on Nov. 14, 2012, is also incorporated herein by reference. The present invention also claims benefit to the US provisional patent application, U.S. 61/726,494.

Moreover, a U.S. provisional patent application, U.S. 61/726,495, titled "Bayesian Diagnostic Predictor Methods and Systems in Computer-Based Medical Education and Training," and filed on Nov. 14, 2012, is also incorporated herein by reference. The present invention also claims benefit to the U.S. provisional patent application, U.S. 61/726,495.

In addition, a U.S. provisional patent application, U.S. 61/726,497, titled "Evidence-Based Virtual Patient Authoring Methods and Systems," and filed on Nov. 14, 2012, is also incorporated herein by reference. The present invention also claims benefit to the U.S. provisional patent application, U.S. 61/726,497.

Furthermore, a U.S. non-provisional patent application, U.S. Ser. No. 14/080,792, titled "Medical Training," and filed on Nov. 14, 2013, is also incorporated herein by reference. The present invention also claims benefit as a continuation-in-part application to the U.S. non-provisional patent application, U.S. Ser. No. 14/080,792.

FIELD OF THE INVENTION

The present invention generally relates to interactive educational software, computerized user interfaces, and electronic systems. The present invention also relates to one or more healthcare education software programs, systems, and methods. More specifically, the present invention also relates to virtual patient examination simulations, medical causal concept diagram constructions and evaluations, and medical content authoring graphical user interfaces, which are executed by a computer or another electronic device.

BACKGROUND OF THE INVENTION

Recent advances in human-computer interfaces associated with computers and other electronic devices enables sophisticated graphical user interactions possible between a human user and a machine In the fields of electronic learning (i.e. also widely known as "e-learning") and educational computer software, various human-computer interactions have been devised and experimented by academia and computer software industry.

However, in the fields of healthcare education and simulation software, conventional e-learning solutions have not yet provided an intuitive medical content authoring software platform that a medical expert or a healthcare instructor can readily utilize to configure, provide, and update computerized medical training and evaluation contents to medical students, trainees, and other healthcare professionals. At best, conventional e-learning solutions have typically required a medical content author to modify or configure a substantial part of computer software codes or underlying software modules in order to generate new graphical physiological simulations and student evaluation methods.

Furthermore, conventional e-learning solutions have not yet provided a fully-integrated medical training and evaluation software platform that encompasses healthcare education-specific needs in student training and evaluation, such as computerized medical causal concept diagram construction and evaluation, computerized prediction table generation and testing with corresponding physiologic simulations, and computerized Bayesian diagnostic predictor generation. At best, conventional e-learning solutions in healthcare education have merely provided disjointed and fragmented training tools with marginal educational benefits to medical students and trainees.

Therefore, it may be desirable to provide a novel and intuitive medical content authoring software platform that a medical expert or a medical instructor can readily utilize to configure, provide, and update computerized medical training and evaluation contents to medical students and trainees. Furthermore, it may also be desirable to provide a novel and versatile medical training and evaluation software platform that coherently integrates healthcare education-specific needs in student training and evaluation, such as computerized medical causal concept diagram construction and evaluation, computerized prediction table generation and testing with corresponding physiologic simulations, and computerized Bayesian diagnostic predictor generation.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an electronic healthcare education system is disclosed. This system comprises: a virtual patient examination simulator interface module, which generates and displays a patient response section with an animated virtual patient and a patient exam result section with a virtual physical exam diagnostic device on a display screen, wherein the animated virtual patient is inspected and diagnosed by a user who controls the virtual physical exam diagnostic device in the virtual patient examination simulator interface module; a medical authoring interface module, which includes graphical user interface tools that allow a healthcare education content creator to create and update a medical training content quickly and easily, without direct modification of underlying computer programming codes by the healthcare education content creator; a medical information database, which contains physiological simulation animation files, evidence-based patient diagnostic information, and other pertinent medical information that are periodically updated by one or more medical experts, wherein at least some information from the medical information database is dynamically linkable or importable to the medical training content, which is being composed by the medical authoring interface module and the healthcare education content creator; and a central processing unit (CPU) and a memory unit of a computer system or another electronic device, wherein the CPU and the memory unit execute at least one of the virtual patient examination simulator interface module, the medical authoring interface module, and the medical information database.

In another embodiment of the invention, a method of operating a medical authoring interface module in an electronic healthcare education system is disclosed. This method comprises the steps of: selecting a symptom of educational interest for virtual patient authoring in a medical authoring interface generated and displayed by the medical authoring interface module, wherein the medical authoring interface module is executed on a CPU and a memory unit of a computer system or another electronic device; identifying differential diagnoses from the medical authoring interface and a medical information database linked to the medical authoring interface; grouping the differential diagnoses by pain location, by acute or chronic nature of the symptom of educational interest, or by visible signs of abnormalities; identifying risk factors, associated signs, and test findings for the symptom of educational interest; and generating interactive medical training and educational contents by utilizing the medical authoring interface and the medical information database.

Yet in another embodiment of the invention, a method of providing an e-learning environment for a structured scientific experiment from an electronic healthcare education system is disclosed. This method comprises the steps of: executing an interactive prediction table module in a CPU and a memory unit of the electronic healthcare education system to generate and display an interactive prediction table with a set of variables, a prediction entry section, and a scientific simulation observation entry section on a display panel connected to the electronic healthcare education system; receiving one or more predictions and hypothesis from a user in the prediction entry section generated by the interactive prediction table module; executing the structured scientific experiment in the CPU and the memory unit of the electronic healthcare education system; displaying simulated experimental outcomes on the display panel; receiving observation notes from the user in the scientific simulation observation entry section generated by the interactive prediction table module; comparing the simulated experimental outcomes against the observation notes and the one or more predictions and the hypothesis entered by the user to generate computerized evaluation notes, wherein the computerized evaluation notes indicate correctness or incorrectness of the user's entries; and displaying the computerized evaluation notes on the display panel.

BRIEF DESCRIPTION OF DRAWINGS

FIG. 9 shows an example of an interactive prediction table incorporating physiological or other scientific simulations, in accordance with an embodiment of the invention.

FIG. 12 shows an evaluation output for interactive prediction table with physiological or other scientific simulation, in accordance with an embodiment of the invention.

DETAILED DESCRIPTION

Figure 1:
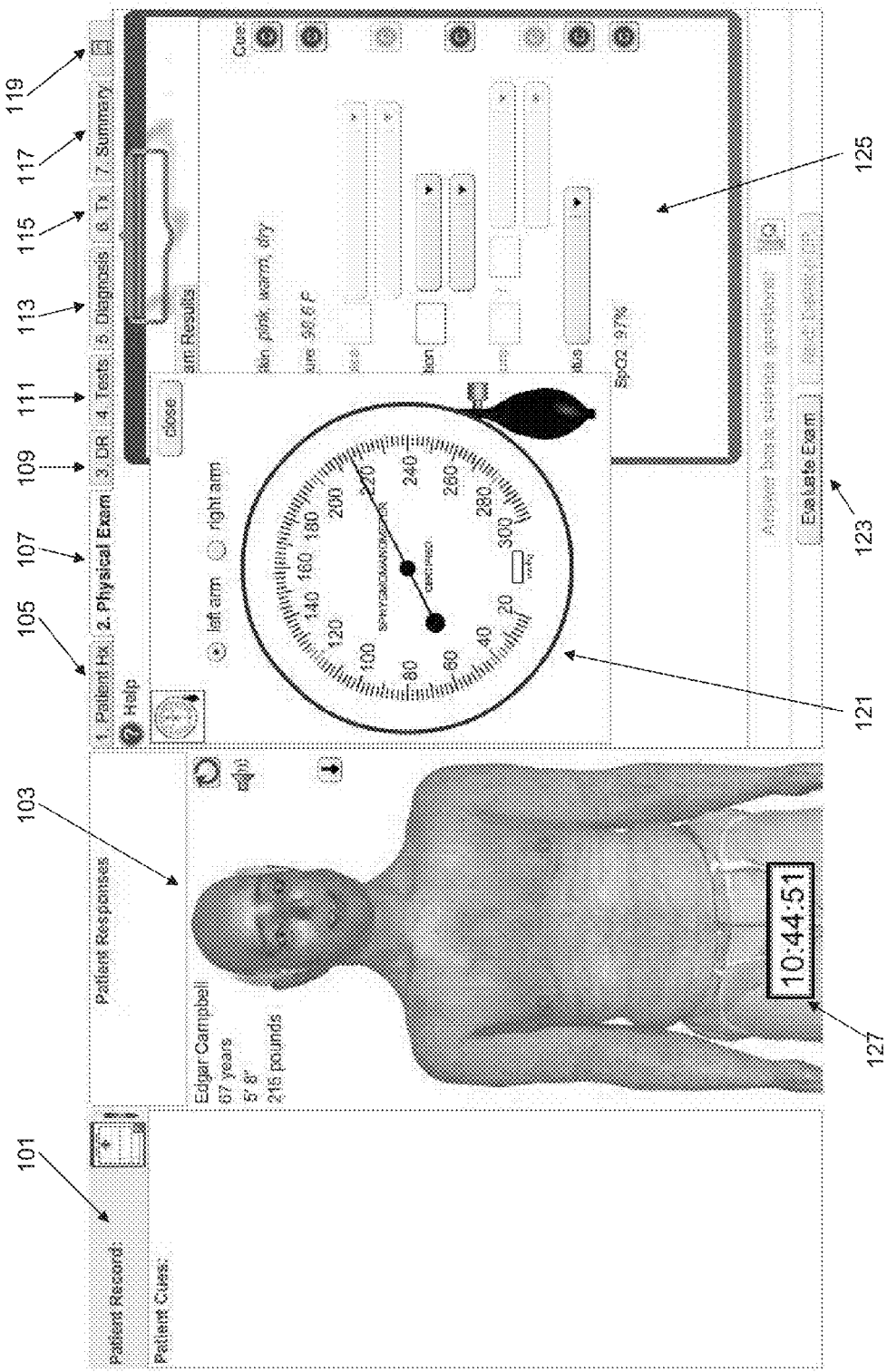
FIG. 1 shows a virtual patient examination simulator interface screenshot for a blood pressure assessment, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble systems and methods for electronic healthcare education. Furthermore, the detailed description is also presented largely in terms of description of computerized user interfaces for medical students and trainees, electronic medical content authoring interfaces for healthcare education experts, and/or other symbolic representations that directly or indirectly resemble computerized systems and methods for electronic healthcare education and healthcare education content authoring. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "virtual patient simulator" is defined as a healthcare education software that graphically and visually simulates an imaginary patient's medical condition or the imaginary patient's reaction to a diagnosis, a measurement, and/or a treatment performed over a computer interface by a medical student, a medical trainee, or another user. The virtual patient simulator is configured to be executed on a CPU and a memory unit of a computer system or another electronic device. The computer system may be a cloud-networked server, a desktop computer, a portable electronic device, or another electronic device.

In addition, for the purpose of describing the invention, a term "medical causal concept diagram" is defined as a computer-generated and user-configurable diagram that graphically links one or more concepts and/or causes to an effect or an observable medical condition. In a preferred embodiment of the invention, computerized medical causal concept diagram construction, evaluation, and comparison interfaces control and configure the medical causal concept diagrams, which are generated and managed by a healthcare education software executed on a CPU and a memory unit of a computer system or another electronic device. In the preferred embodiment of the invention, the medical causal concept diagrams may have multiple depths and layers for linking causes, concepts, effects, and/or conditions.

In addition, for the purpose of describing the invention, a term "interactive prediction table" is defined as a computer-generated and user-configurable interface that allows a healthcare education software user (e.g. a medical student, a trainee, or a casual user) to predict a medical outcome based on a set of hypothetical conditions and circumstances presented by the healthcare education software. Preferably, the interactive prediction table is also linked to a physiological or other scientific simulation interface, so that the healthcare education software user can observe and compare with an expert-defined simulated result for educational purposes. For example, a medical student may be able to place "up" arrows or "down" arrows in the interactive prediction table to predict whether the total renal resistance (Rtot), renal blood flow (RBF), and Glomerular hydrostatic pressure (Pgf) are likely to go up or down, if there is an increase in efferent arteriole resistance. Then, the medical student can compare his or her predictions with the expert-defined physiological or other scientific simulations and observable results.

Moreover, for the purpose of describing the invention, a term "authoring interface" is defined as a graphical user interface-based (GUI-based) healthcare education content creation and updating platform for medical educators and experts. In a preferred embodiment of the invention, the authoring interface does not require a medical educator or an expert to understand and modify computer programming codes for creating or modifying healthcare education contents. Instead, the authoring interface provides a graphical user interface and standardized tools for quick and seamless healthcare education content creation and modifications.

Furthermore, for the purpose of describing the invention, a term "physiological or other scientific simulation" is defined as a computer-generated and user-configurable graphical simulation of an observable physiological phenomenon or an observable physiological effect after a hypothetical condition or a hypothetical treatment is applied to a virtual patient or to a particular body part of the virtual patient. In a preferred embodiment of the invention, the physiological or other scientific simulation is provided by a healthcare education software executed on a CPU and a memory unit of a computer system or another electronic device.

In addition, for the purpose of describing the invention, a term "electronic healthcare education system" is defined as a healthcare education software executed on a CPU and a memory unit of a computer system or another electronic device, which is utilized to educate and train healthcare trainees, professionals, students, and other users such as physicians, medical students, physician assistants, nurses, emergency response personnel, and other healthcare workers.

One aspect of an embodiment of the present invention is providing a novel and intuitive medical content authoring software platform that a medical expert or a medical instructor can readily utilize to configure, provide, and update computerized medical training and evaluation contents to medical students and trainees.

Another aspect of an embodiment of the present invention is to provide a novel and versatile medical training, simulation, and evaluation software platform that coherently integrates healthcare education-specific needs in student training and evaluation.

Yet another aspect of an embodiment of the present invention is to provide a medical training software platform that incorporates computerized medical causal concept diagram construction and evaluation.

Furthermore, another aspect of an embodiment of the present invention is to provide a medical training software platform that incorporates computerized prediction table generation and testing with corresponding physiologic simulations.

Yet another aspect of an embodiment of the present invention is to provide a medical training software platform that incorporates computerized Bayesian diagnostic predictor generation.

FIG. 1 shows a virtual patient examination simulator interface screenshot (100) for a blood pressure assessment, in accordance with an embodiment of the invention. In a preferred embodiment of the invention, the virtual patient examination simulator interface is part of a healthcare education software that can graphically and visually simulate an imaginary (i.e. virtual) patient's medical condition for healthcare education and training of students or other users. Furthermore, the virtual patient examination simulator interface is also configured to simulate the imaginary patient's reaction to a diagnosis, a measurement, and/or a treatment performed over a computer interface by a medical student, a medical trainee, or another user.

As shown in FIG. 1, the healthcare education software is capable of displaying the virtual patient examination simulator interface. In the preferred embodiment of the invention, the virtual patient examination simulator interface comprises a patient record section (101), a patient response section (103), a measurement clock (127) in the patient response section (103), and a user control section that includes a multiple number of functional controls. The patient record section (101) contains medical charts and records associated with a virtual patient, and a user (i.e. typically a medical student or trainee) can write any patient-related information into the patient record section (101), as the healthcare education software simulates real-life health conditions, health exams, and diagnosis associated with the virtual patient. The healthcare education software also evaluates the user's logical reasoning and thought processes throughout the virtual patient simulation environment provided by the virtual patient examination interface.

Furthermore, as shown in FIG. 1, the patient response section (103) is configured to display the virtual patient and any pertinent physiological information associated with the virtual patient. In addition, the measurement clock (127) displayed in the patient response section (103) can be utilized for measuring rates and durations for physical exams performed to the virtual patient. The virtual patient displayed in the patient response section (103) may also simulate certain medical conditions or symptoms (e.g. skin infections, discoloration, facial redness, rashes, and etc.) that may be visible to the naked eye.

Continuing with FIG. 1, in the preferred embodiment of the invention, the user control section comprises a patient health history tab (105), a physical exam tab (107), a diagnostic reasoning assessment tab (109), a medical test results tab (111), a diagnosis tab (113), a treatment and management plan tab (115), a summary tab (117), and a miscellaneous notepad tab (119). The patient health history tab (105), when selected by the user on the virtual patient examination simulator interface, can retrieve the virtual patient's health history. The user can also ask questions to the virtual patient examination simulator interface under the patient health history tab (105), and receive responses from a medical expert opinion database, which is operatively connected to the healthcare education software and the virtual patient examination simulator interface.

Furthermore, in the preferred embodiment of the invention, the physical exam tab (107), when selected by the user on the virtual patient examination simulator interface, enables the user to perform one or more health exams on the virtual patient. For example, as shown in the virtual patient examination simulator interface screenshot (100) in FIG. 1, the user can select a sphygmomanometer (121) from a menu list of available virtual health exams, and then proceed to measure the blood pressure of the virtual patient. In this screenshot example (100), the user can even select the left arm or the right arm of the virtual patient for the blood pressure measurement. The computer-simulated measured results (e.g. blood pressure reading) can then be recorded into a patient exam results section (125) by the user or the healthcare education software, so that the user's medical knowledge and diagnostic skills can be further evaluated by the healthcare education software.

In addition, in one embodiment of the invention, the "evaluate exam" button (123) in the virtual patient examination simulator, when triggered, can compare and evaluate the user's patient exams and related records with a medical expert's model answers and diagnosis, so that the user can gain valuable medical training, diagnostic, and treatment experiences from the virtual patient examination simulator that closely mimic real-life patient encounters. Furthermore, medical educators are able to readily evaluate the user's patient diagnostic reasoning proficiency and medical knowledge by reviewing the evaluation results generated by the healthcare education software in accordance with an embodiment of the invention.

Moreover, the diagnostic reasoning assessment tab (109), when selected by the user utilizing the virtual patient examination simulator interface, allows the user to organize problems and findings from the physical exams and the virtual patient's health records. The user can also write problem statements, perform differential diagnosis for the virtual patient, and order medical tests in a computer simulation environment that mimics actual medical tests under the diagnostic reasoning assessment tab (109) menu. From the medical educator's perspective, the user's written statements associated with the diagnostic reasoning assessment tab (109) serve as quality indicators of the user's medical knowledge and patient diagnostic reasoning proficiency.

Continuing with FIG. 1, the medical test results tab (111), when selected by the user utilizing the virtual patient examination simulator interface, presents computer-simulated medical test results for one or more medical tests that were ordered by the user under the diagnostic reasoning assessment tab (109). The computer-simulated medical test results can then be construed by the user, who is typically a medical student or another healthcare trainee, for formulating a finalized diagnosis, treatments, and/or disease management plans. In the preferred embodiment of the invention, the user's finalized diagnosis can be evaluated and recorded under the diagnosis tab (113), and the user's virtual patient treatments and/or disease management plans can be evaluated and recorded under the treatment and management plan tab (115).

Furthermore, the user control section in the virtual patient examination simulator interface also include the summary tab (117), which presents a summary of all diagnosis and other medical assessment data that the user has composed, assessed, and configured, when the summary tab (117) is selected. The summary tab (117) can also include external reading references and other medical information that a medical educator would like to recommend to the user for additional training and studies. In addition, in one embodiment of the invention, the user control section in the virtual patient examination simulator interface can also include the miscellaneous notepad tab (119), which allows the user to enter any miscellaneous notes and free-form texts for his or her training and studies associated with diagnosis, treatment, and managed care of the virtual patient.

In the preferred embodiment of the invention, the virtual patient examination simulator interface is a software module in a healthcare education software. Moreover, the virtual patient examination simulator interface and the healthcare education software are configured to be executed on a CPU and a memory unit of a computer system or another electronic device. The computer system may be a cloud-networked server, a desktop computer, a portable electronic device, or another electronic device. The cloud-networked server, the desktop computer, or the portable electronic device may be further connected to other electronic devices and medical record databases for data communication, data storage, and information sharing during the operation of the virtual patient examination simulator interface and the healthcare education software.

Figure 2:
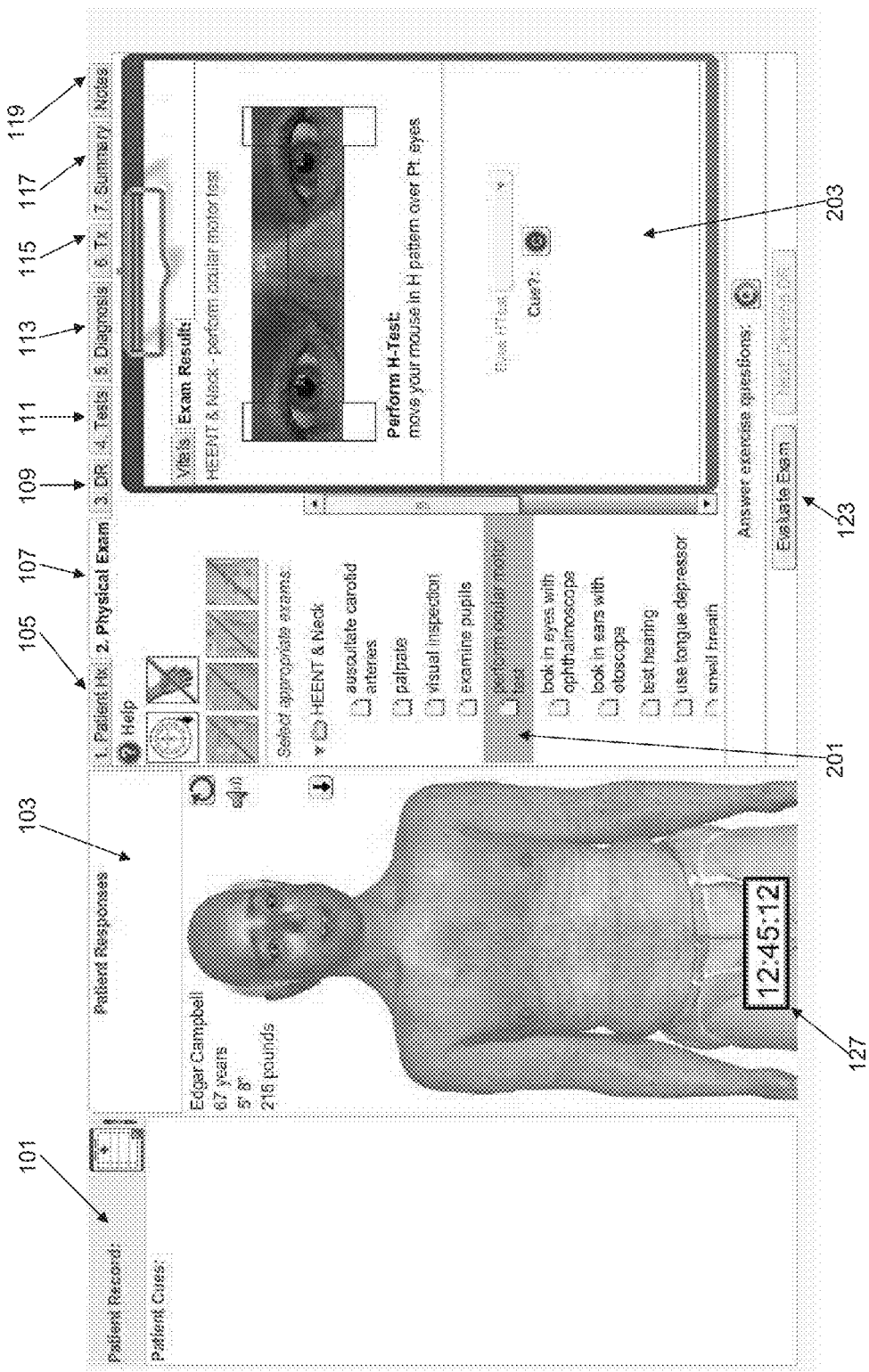
FIG. 2 shows a virtual patient examination simulator interface screenshot for an ocular motor examination, in accordance with an embodiment of the invention.

FIG. 2 shows a virtual patient examination simulator interface screenshot (200) for an ocular motor examination, in accordance with an embodiment of the invention. In this embodiment of the invention, the virtual patient examination simulator interface is part of a healthcare education software that can graphically and visually simulate an imaginary (i.e. virtual) patient's medical condition for healthcare education and training of students or other users. Furthermore, the virtual patient examination simulator interface is also configured to simulate the imaginary patient's reaction to a diagnosis, a measurement, and/or a treatment performed over a computer interface by a medical student, a medical trainee, or another user.

As shown in FIG. 2, the healthcare education software is capable of displaying the virtual patient examination simulator interface. In the preferred embodiment of the invention, the virtual patient examination simulator interface comprises a patient record section (101), a patient response section (103), a measurement clock (127) in the patient response section (103), and a user control section that includes a multiple number of functional controls. The patient record section (101) contains medical charts and records associated with a virtual patient, and a user (i.e. typically a medical student or trainee) can write any patient-related information into the patient record section (101), as the healthcare education software simulates real-life health conditions, health exams, and diagnosis associated with the virtual patient. The healthcare education software also evaluates the user's logical reasoning and thought processes throughout the virtual patient simulation environment provided by the virtual patient examination interface.

Furthermore, as shown in FIG. 2, the patient response section (103) is configured to display the virtual patient and any pertinent physiological information associated with the virtual patient. In addition, the measurement clock (127) displayed in the patient response section (103) can be utilized for measuring rates and durations for physical exams performed to the virtual patient. The virtual patient displayed in the patient response section (103) may also simulate certain medical conditions or symptoms (e.g. skin infections, discoloration, facial redness, rashes, and etc.) that may be visible to the naked eye.

Continuing with FIG. 2, in the preferred embodiment of the invention, the user control section comprises a patient health history tab (105), a physical exam tab (107), a diagnostic reasoning assessment tab (109), a medical test results tab (111), a diagnosis tab (113), a treatment and management plan tab (115), a summary tab (117), and a miscellaneous notepad tab (119). The patient health history tab (105), when selected by the user on the virtual patient examination simulator interface, can retrieve the virtual patient's health history. The user can also ask questions to the virtual patient examination simulator interface under the patient health history tab (105), and receive responses from a medical expert opinion database, which is operatively connected to the healthcare education software and the virtual patient examination simulator interface.

Furthermore, in the preferred embodiment of the invention, the physical exam tab (107), when selected by the user on the virtual patient examination simulator interface, enables the user to perform one or more health exams on the virtual patient. For example, as shown in the virtual patient examination simulator interface screenshot (200) in FIG. 2, the user can select "perform ocular motor test" (201) from a menu list of available virtual health exams, and then proceed to initiate the ocular motor test to the virtual patient, as shown in the "Exam Results" window (203). In this screenshot example (200), the user is instructed by the virtual patient examination simulator interface to move the mouse in "H" pattern over the virtual patient's eyes, as shown in FIG. 2. The computer-simulated measured results (e.g. ocular motor test) can then be recorded into the "Exam Results" window (203), so that the user can observe the test procedures while being further evaluated on his or her medical knowledge and diagnostic skills by the healthcare education software. As also shown by the "Exam Results" window (203), the user may also click on the "Cue?" icon to receive hints or additional guidance in the meaning of the simulated graphical movements between the patient's eyes during the ocular motor test for educational and training purposes.

In addition, in one embodiment of the invention, the "evaluate exam" button (123) in the virtual patient examination simulator, when triggered, can compare and evaluate the user's patient exams and related records with a medical expert's model answers and diagnosis, so that the user can gain valuable medical training, diagnostic, and treatment experiences from the virtual patient examination simulator that closely mimic real-life patient encounters. Furthermore, medical educators are able to readily evaluate the user's patient diagnostic reasoning proficiency and medical knowledge by reviewing the evaluation results generated by the healthcare education software in accordance with an embodiment of the invention.

Moreover, the diagnostic reasoning assessment tab (109), when selected by the user utilizing the virtual patient examination simulator interface, allows the user to organize problems and findings from the physical exams and the virtual patient's health records. The user can also write problem statements, perform differential diagnosis for the virtual patient, and order medical tests in a computer simulation environment that mimics actual medical tests under the diagnostic reasoning assessment tab (109) menu. From the medical educator's perspective, the user's written statements associated with the diagnostic reasoning assessment tab (109) serve as quality indicators of the user's medical knowledge and patient diagnostic reasoning proficiency.

Continuing with FIG. 2, the medical test results tab (111), when selected by the user utilizing the virtual patient examination simulator interface, presents computer-simulated medical test results for one or more medical tests that were ordered by the user under the diagnostic reasoning assessment tab (109). The computer-simulated medical test results can then be construed by the user, who is typically a medical student or another healthcare trainee, for formulating a finalized diagnosis, treatments, and/or disease management plans. In the preferred embodiment of the invention, the user's finalized diagnosis can be evaluated and recorded under the diagnosis tab (113), and the user's virtual patient treatments and/or disease management plans can be evaluated and recorded under the treatment and management plan tab (115).

Furthermore, the user control section in the virtual patient examination simulator interface also include the summary tab (117), which presents a summary of all diagnosis and other medical assessment data that the user has composed, assessed, and configured, when the summary tab (117) is selected. The summary tab (117) can also include external reading references and other medical information that a medical educator would like to recommend to the user for additional training and studies. In addition, in one embodiment of the invention, the user control section in the virtual patient examination simulator interface can also include the miscellaneous notepad tab (119), which allows the user to enter any miscellaneous notes and free-form texts for his or her training and studies associated with diagnosis, treatment, and managed care of the virtual patient.

In the preferred embodiment of the invention, the virtual patient examination simulator interface is a software module in a healthcare education software. Moreover, the virtual patient examination simulator interface and the healthcare education software are configured to be executed on a CPU and a memory unit of a computer system or another electronic device. The computer system may be a cloud-networked server, a desktop computer, a portable electronic device, or another electronic device. The cloud-networked server, the desktop computer, or the portable electronic device may be further connected to other electronic devices and medical record databases for data communication, data storage, and information sharing during the operation of the virtual patient examination simulator interface and the healthcare education software.

Figure 3:
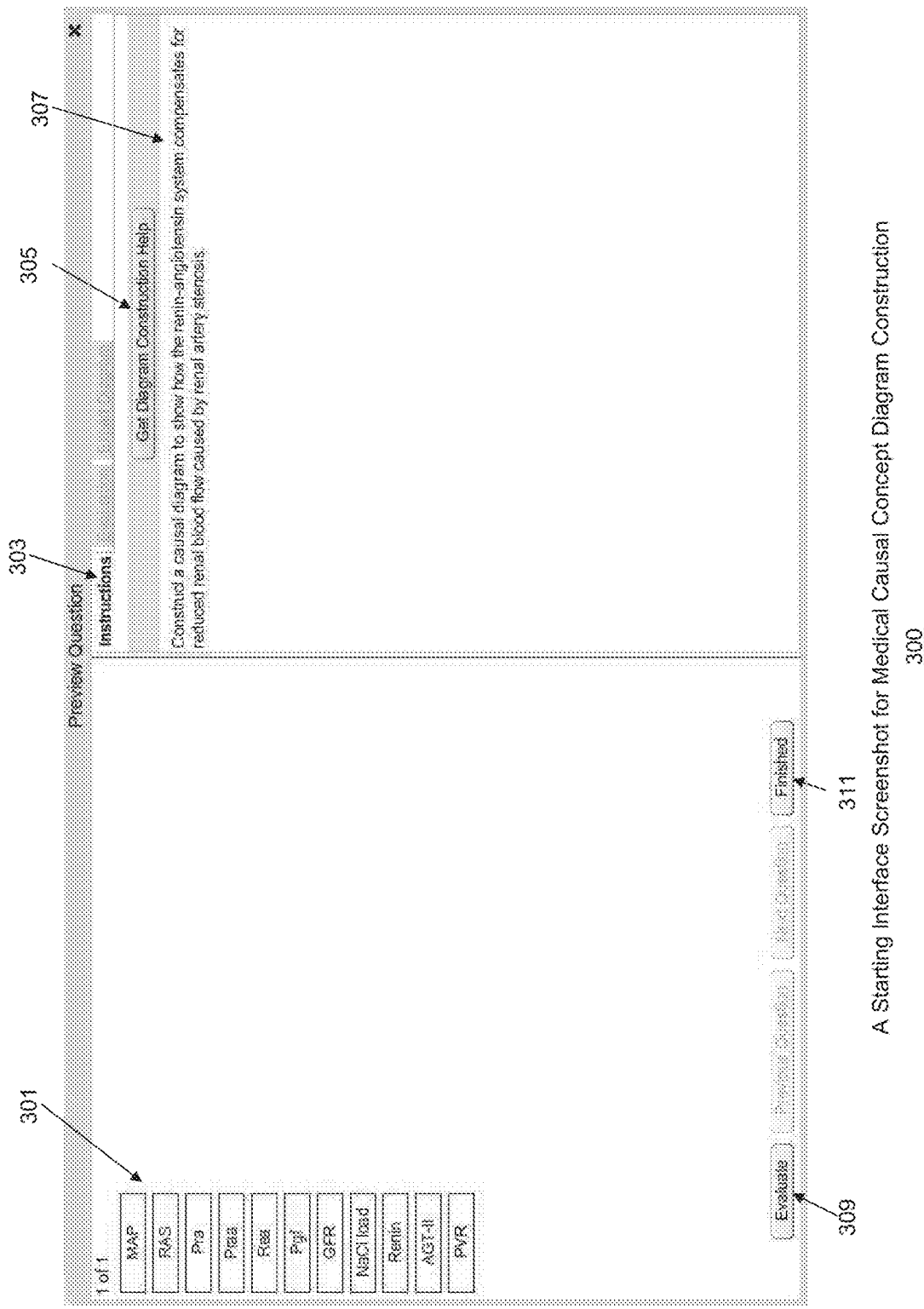
FIG. 3 shows a starting interface screenshot for medical causal concept diagram construction, in accordance with an embodiment of the invention.

FIG. 3 shows a starting interface screenshot (300) for medical causal concept diagram construction, in accordance with an embodiment of the invention. In this embodiment of the invention, the starting interface screenshot (300) for the medical causal concept diagram construction includes one or more causal concept blocks (301), an "evaluate" button (309), and a "finished" button (311) in a causal concept construction section, and an instructions tab (303), a diagram construction help button (305), and an instruction description (307) in an instruction section, as shown in FIG. 3.

As shown in the instruction description (307) in the instruction section of the starting interface screenshot (300) for the medical causal concept diagram construction, the user in this example is instructed to construct a causal concept diagram that shows how the rennin-angiotensin system compensates for reduced renal blood flow caused by renal artery stenosis. Preferably, this instruction description (307) appears in the instruction section when and if the user selects the instructions tab (303) by a mouse click, by touch on a touch screen, or by another tab-selection method on a computer-generated user interface. The user can also click or select the diagram construction help button (305) to receive computer-generated assistance on medical causal concept diagram constructions.

In one embodiment of the invention, each of the causal concept blocks (301) can be dragged and dropped to a particular position in the causal concept construction section by the mouse connected to a computer system. In an alternate embodiment of the invention, the causal concept blocks (301) can be dragged and dropped to the particular position in the causal concept construction section by the user's fingers on the touch screen connected to the computer system. In the example as shown in FIG. 3, eleven causal concept blocks (i.e. "MAP," "RAS," "Pra," "Praa," "Rea," "Pgf," "GFR," "NaCl load," "Renin," "AGT-II," and "PVR") are listed as potential causal concepts, which may be potentially linked to each other as part of the causal diagram that shows how the rennin-angiotensin system compensates for reduced renal blood flow caused by renal artery stenosis.

The starting interface for the medical causal concept diagram construction, as shown in FIG. 3, allows the user (e.g. a medical student or a trainee) to apply his or her own medical knowledge and clinical understanding to create a causal concept diagram for a simulated clinical situation associated with a virtual patient. Then, when and if the user selects the "evaluate" button (309) at a later step, the user's created causal concept diagrams can be compared against model answers from a medical educator or a medical expert for the user evaluation and training purposes. In addition, in one embodiment of the invention, the "finished" button (311) allows the user to advance or exit from the medical causal concept diagram construction interface to explore other aspects of the healthcare education software embodied by the present invention.

In a preferred embodiment of the invention, computerized medical causal concept diagram construction interface enables the user to control and configure the medical causal concept diagrams. Furthermore, the medical causal concept diagrams are generated and managed by the healthcare education software executed on a CPU and a memory unit of a computer system or another electronic device. The medical causal concept diagrams may have multiple depths and layers for linking causes, concepts, effects, and/or conditions.

Figure 4:
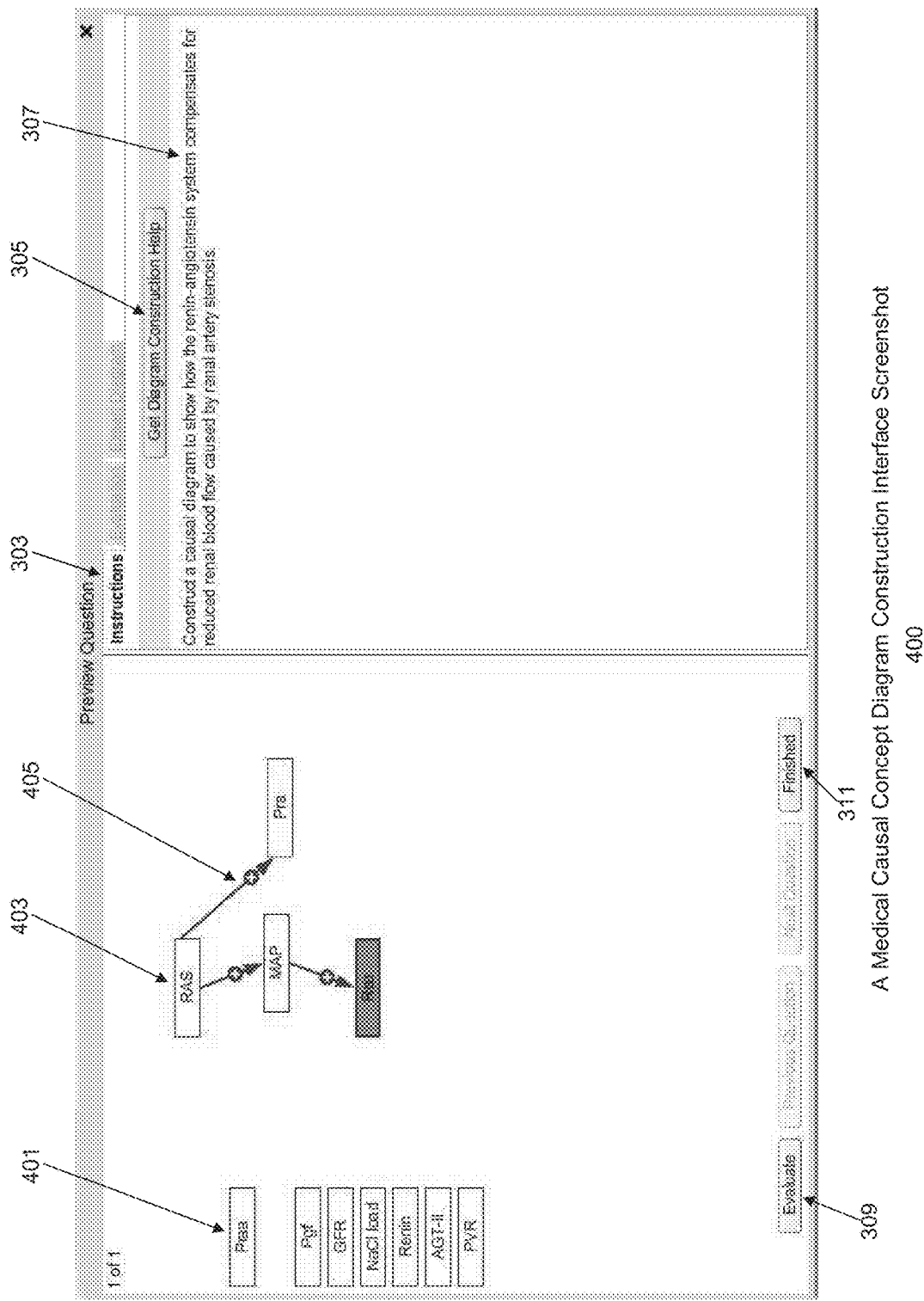
FIG. 4 shows a medical causal concept diagram construction interface screenshot, in accordance with an embodiment of the invention.

FIG. 4 shows a medical causal concept diagram construction interface screenshot (400), in accordance with an embodiment of the invention. In this embodiment of the invention, the medical causal concept diagram construction interface screenshot (400) includes one or more selected and active causal concept blocks (403), and one or more arrows (405) that link a selected and active causal concept block to another selected and active causal concept block in order to create a causal relationship, a directly-proportional relationship, or an inversely-proportional relationships between the causal concept blocks. Furthermore, the medical causal concept diagram construction interface screenshot (400) also shows a list of unused causal concept blocks (401), each of which can be selected and dragged to a particular position in a causal concept construction section for the construction of medical causal concept diagrams. Furthermore, the medical causal concept diagram construction interface also includes an "evaluate" button (309) and a "finished" button (311) in a causal concept construction section, and an instructions tab (303), a diagram construction help button (305), and an instruction description (307) in an instruction section, as shown in FIG. 4.

As shown in the instruction description (307) in the instruction section of the starting interface screenshot (300) for the medical causal concept diagram construction, the user in this example is instructed to construct a causal concept diagram that shows how the rennin-angiotensin system compensates for reduced renal blood flow caused by renal artery stenosis. Preferably, this instruction description (307) appears in the instruction section when and if the user selects the instructions tab (303) by a mouse click, by touch on a touch screen, or by another tab-selection method on a computer-generated user interface. The user can also click or select the diagram construction help button (305) to receive computer-generated assistance on medical causal concept diagram constructions.

In one embodiment of the invention, each of the unused causal concept blocks (401) can be dragged and dropped to a particular position in the causal concept construction section by the mouse connected to a computer system. In an alternate embodiment of the invention, the causal concept blocks (401) can be dragged and dropped to the particular position in the causal concept construction section by the user's fingers on the touch screen connected to the computer system.

In the example as shown in FIG. 4, the user has selected the "RAS" block, the "MAP" block, the "Pra" block, and the "Rea" block, and connected the four blocks with arrows to create causal, directly-proportional, and/or inversely-proportional relationships that are supposed to show how the rennin-angiotensin system compensates for reduced renal blood flow caused by renal artery stenosis.

The causal concept diagram created by the user in the causal concept construction section, as shown in FIG. 4, may not necessarily be correct. However, this interface provides the user (e.g. a medical student or a trainee) a valuable hands-on opportunity to apply his or her own medical knowledge and clinical understanding to create a causal concept diagram for a simulated clinical situation associated with a virtual patient. Then, when and if the user selects the "evaluate" button (309) at a later step, the user's created causal concept diagrams can be compared against model answers from a medical educator or a medical expert for the user evaluation and training purposes. In addition, in one embodiment of the invention, the "finished" button (311) allows the user to advance or exit from the medical causal concept diagram construction interface to explore other aspects of the healthcare education software embodied by the present invention.

Figure 5:
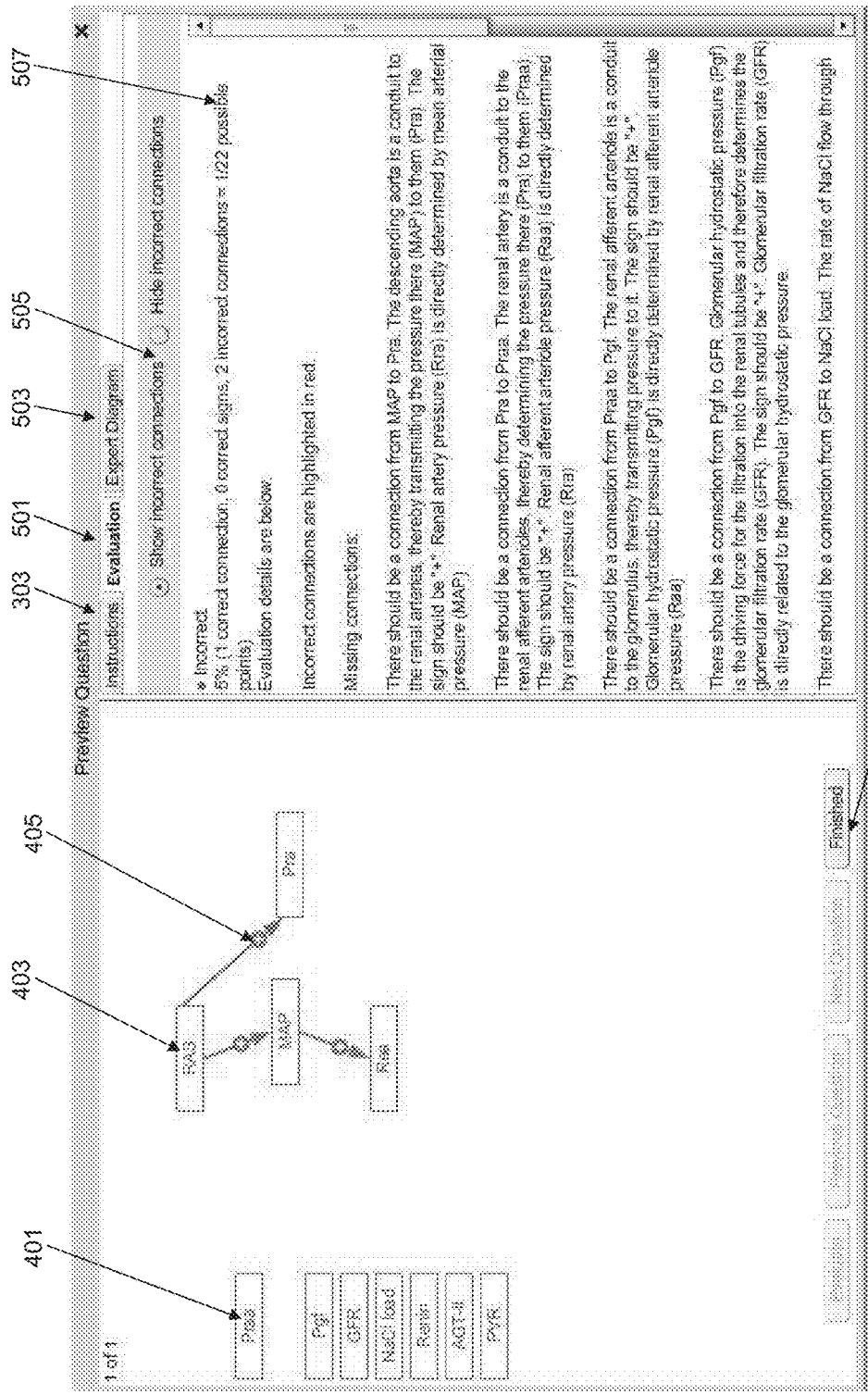
FIG. 5 shows a medical causal concept diagram evaluation interface screenshot, in accordance with an embodiment of the invention.

FIG. 5 shows a medical causal concept diagram evaluation interface screenshot (500), in accordance with an embodiment of the invention. In a preferred embodiment of the invention, after the user creates a medical causal concept diagram with one or more selected and active causal concept blocks (403) and arrows (405) from a list of causal concept blocks (401), the medical causal concept diagram created by the user can be evaluated by the healthcare education software. The computer-generated evaluation is triggered by the user selecting the "evaluate" button (309 of FIG. 3), which then brings an evaluation section (507) under an evaluation tab (501), as shown in FIG. 5.

In the evaluation section (507), the user can also choose to highlight any incorrect connections in the user-created medical causal concept diagram by selecting an appropriate radio button (i.e. "Show incorrect connections") in a diagram correction highlight controller (505). In the medical causal concept diagram evaluation interface screenshot (500) of FIG. 5, two incorrectly-connected arrows are highlighted in red, while the correctly-connected arrow is color-coded in blue.

Alternatively, the user can also choose to hide any incorrect connections in the user-created medical causal concept diagram by selecting an appropriate radio button (i.e. "Hide incorrect connections") in the diagram correction highlight controller (505). Furthermore, as shown in FIG. 5, the evaluation section (507) can display a detailed explanation why the user's medical causal concept diagram is either correct or incorrect. Moreover, an expert diagram tab (503), if selected by the user, can display an expert-defined model causal concept diagram, which can be compared side by side with the user-created medical causal concept diagram.

Figure 6:
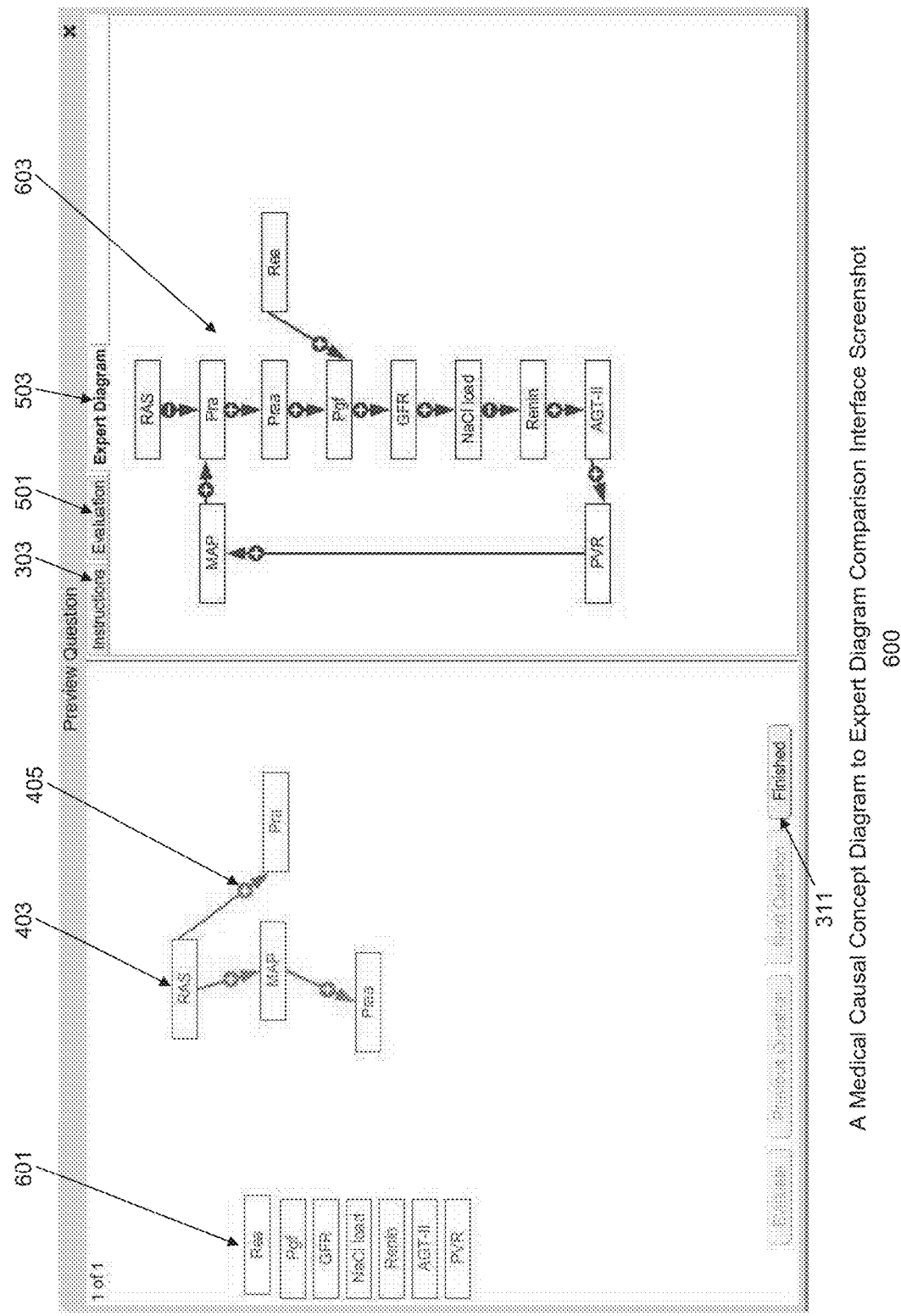
FIG. 6 shows a medical causal concept diagram to expert diagram comparison interface screenshot, in accordance with an embodiment of the invention.

FIG. 6 shows a medical causal concept diagram to expert diagram comparison interface screenshot (600), in accordance with an embodiment of the invention. In one embodiment of the invention, the user-created medical causal concept diagram (e.g. 403, 405) is located on the left-side of the comparison interface, and is juxtaposed against a medical expert's causal diagram (603), which appears on the right-side of the comparison interface. An unused list (601) of causal concept blocks is also shown on the left edge of the comparison interface. The user-created medical causal concept diagram (e.g. 403, 405) can be recorded and stored in a data storage associated with the healthcare education software for subsequent computer-generated evaluation. In some instances, a medical educator may manually review and evaluate the user-created medical causal concept diagram, in addition to the computer-generated evaluation.

In a preferred embodiment of the invention, the medical causal concept diagram to expert diagram comparison interface, as shown in FIG. 6, is a software module in the healthcare education software, and is displayed on a display screen of a computer system or an electronic device, which executes the healthcare education software. Preferably, the medical causal concept diagram to expert diagram comparison interface is invoked and activated for display when the user selects the expert diagram tab (503).

Furthermore, the user can select the instructions tab (303) to refer back to the causal diagram construction instructions. Likewise, the user can also select the evaluation tab (501) to refer back to the detailed evaluation comments in the evaluation section (507), as previously described for FIG. 5. In addition, the user can also select the "finished" button (311) to advance or exit from the medical causal concept diagram to expert diagram comparison interface to explore other aspects of the healthcare education software embodied by the present invention.

Figure 7:
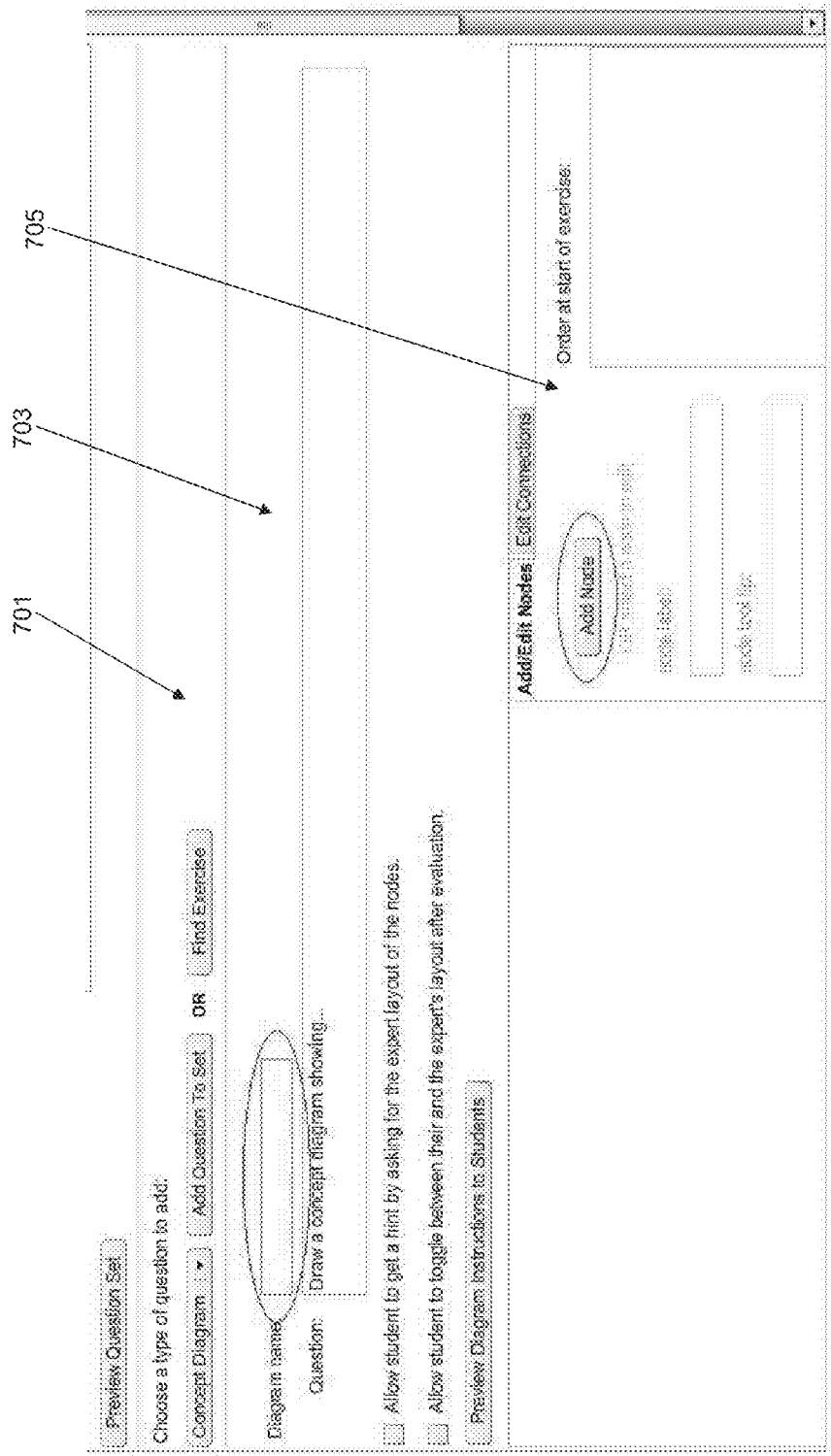
FIG. 7 shows a medical causal concept diagram authoring interface screenshot for healthcare education authors, in accordance with an embodiment of the invention.

FIG. 7 shows a medical causal concept diagram authoring interface screenshot (700) for healthcare education authors, in accordance with an embodiment of the invention. In a preferred embodiment of the invention, the medical causal concept diagram authoring interface is a graphical user interface-based (GUI-based) healthcare education content creation and updating platform for medical educators and experts. As shown in FIG. 7, a healthcare education content creator (e.g. a medical educator, a medical expert, an academic instructor, and etc.) can utilize a plurality of drop-down menus in a question type creation toolbar (701) to create a concept diagram exercise question type or another type of question from an existing library of exercises, which are linked to the "Find Exercise" button.

Furthermore, the healthcare education content creator can also utilize a concept diagram question composer (703) to label a causal concept diagram and to describe a desired question for healthcare education and training. As shown in the medical causal concept diagram authoring interface screenshot (700), the healthcare education content creator can also allow a user (e.g. a student) to receive a hint by asking for the expert layout of the nodes, and also allow the user to toggle between the user's diagram and the expert's diagram after the computer-executed evaluation of the user's diagram is completed, as shown in the concept diagram question composer (703).

Moreover, the healthcare education content creator can also utilize a node editor (705) to add or edit nodes (e.g. causal concept blocks) and connections (e.g. arrow links between causal concept blocks) for a particular causal concept diagram question currently being composed through the medical causal concept diagram authoring interface. In one embodiment of the invention, the medical causal concept diagram authoring interface is configured to be executed on a CPU and a memory unit of a computer system or another electronic device. The computer system may be a cloud-networked server, a desktop computer, a portable electronic device, or another electronic device. Preferably, the medical causal concept diagram authoring interface is a software module associated with the healthcare education software that accommodates healthcare education content creation and updates by medical experts, while also providing interactive virtual patient diagnosis and treatment training to students and trainees.

The innovative authoring interface disclosed in accordance with an embodiment of the present invention does not require the healthcare education content creator to understand and modify computer programming codes for creating or modifying healthcare education contents. Instead, the authoring interface, as exemplified by the medical causal concept diagram authoring interface screenshot (700) in FIG. 7, provides an intuitive and reusable graphical user interface and standardized tools for quick and seamless healthcare education content creation and modifications by the healthcare education content creator who may not be familiar with any underlying software codes that constitute the authoring interface and the healthcare education software.

Figure 8:
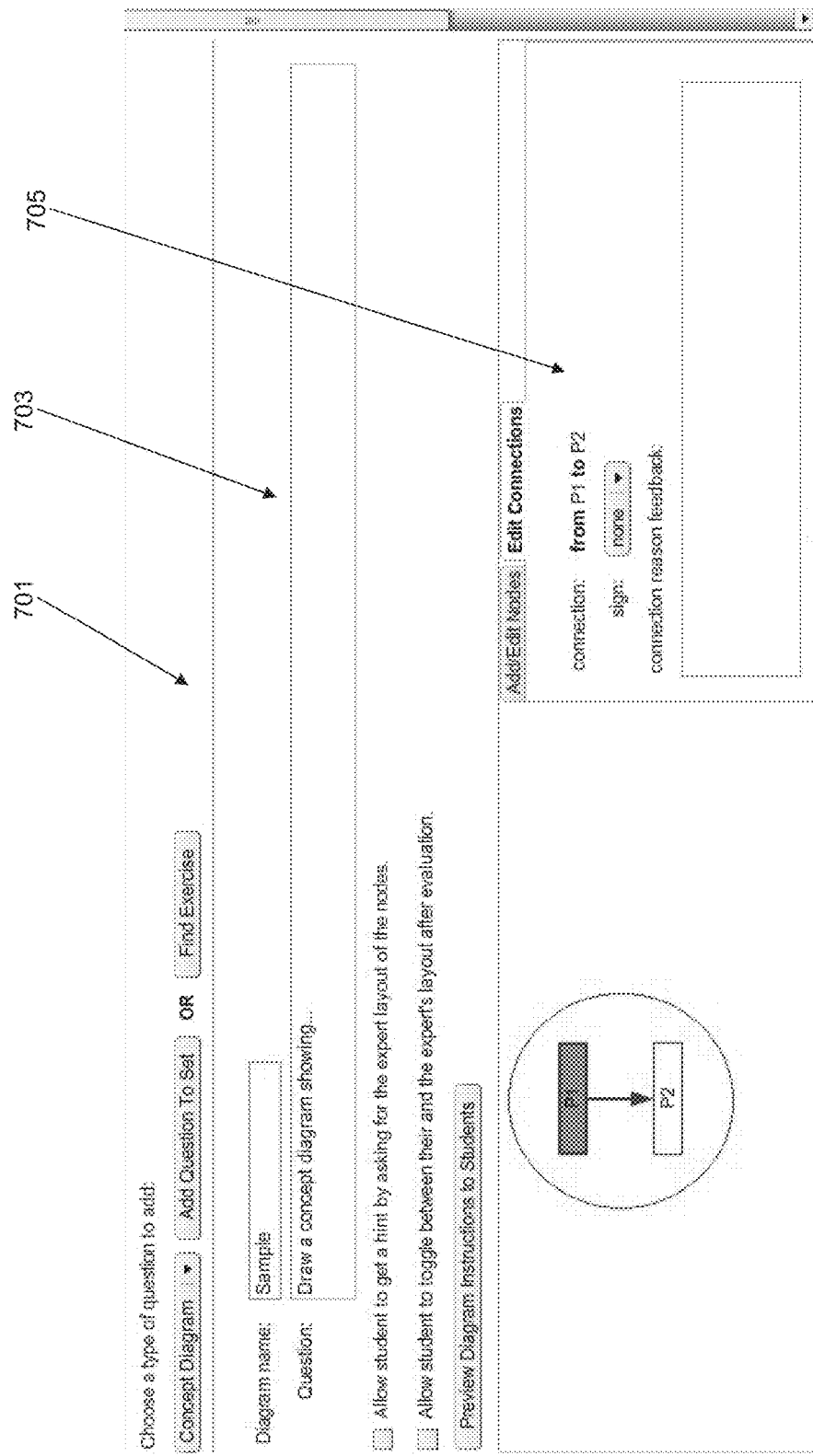
FIG. 8 shows another medical causal concept diagram authoring interface screenshot for healthcare education authors, in accordance with an embodiment of the invention.

FIG. 8 shows another medical causal concept diagram authoring interface screenshot (800) for healthcare education authors, in accordance with an embodiment of the invention. Continuing from the screenshot (700) in FIG. 7, the new screenshot (800) in FIG. 8 shows that the healthcare education content creator has chosen a particular question type from the question type creation toolbar (701), and has also entered the diagram name (i.e. "Sample") in the concept diagram question composer (703).

Furthermore, the new screenshot (800) in FIG. 8 also shows that the healthcare education content creator is currently editing connections (e.g. arrow links between causal concept blocks "P1" and "P2") by utilizing the node editor (705), which allows addition and editing of nodes (e.g. causal concept blocks) and connections (e.g. arrow links between causal concept blocks). Because the innovative authoring interface (i.e. disclosed in accordance with an embodiment of the present invention in FIG. 7 and FIG. 8) does not require the healthcare education content creator to understand and modify computer programming codes for creating or modifying healthcare education contents, the present invention enables the healthcare education creator to concentrate his or her efforts on robust content updates and modifications, while minimizing time spent on re-configuring the underlying software programs and codes associated with the healthcare education software.

Figure 9:
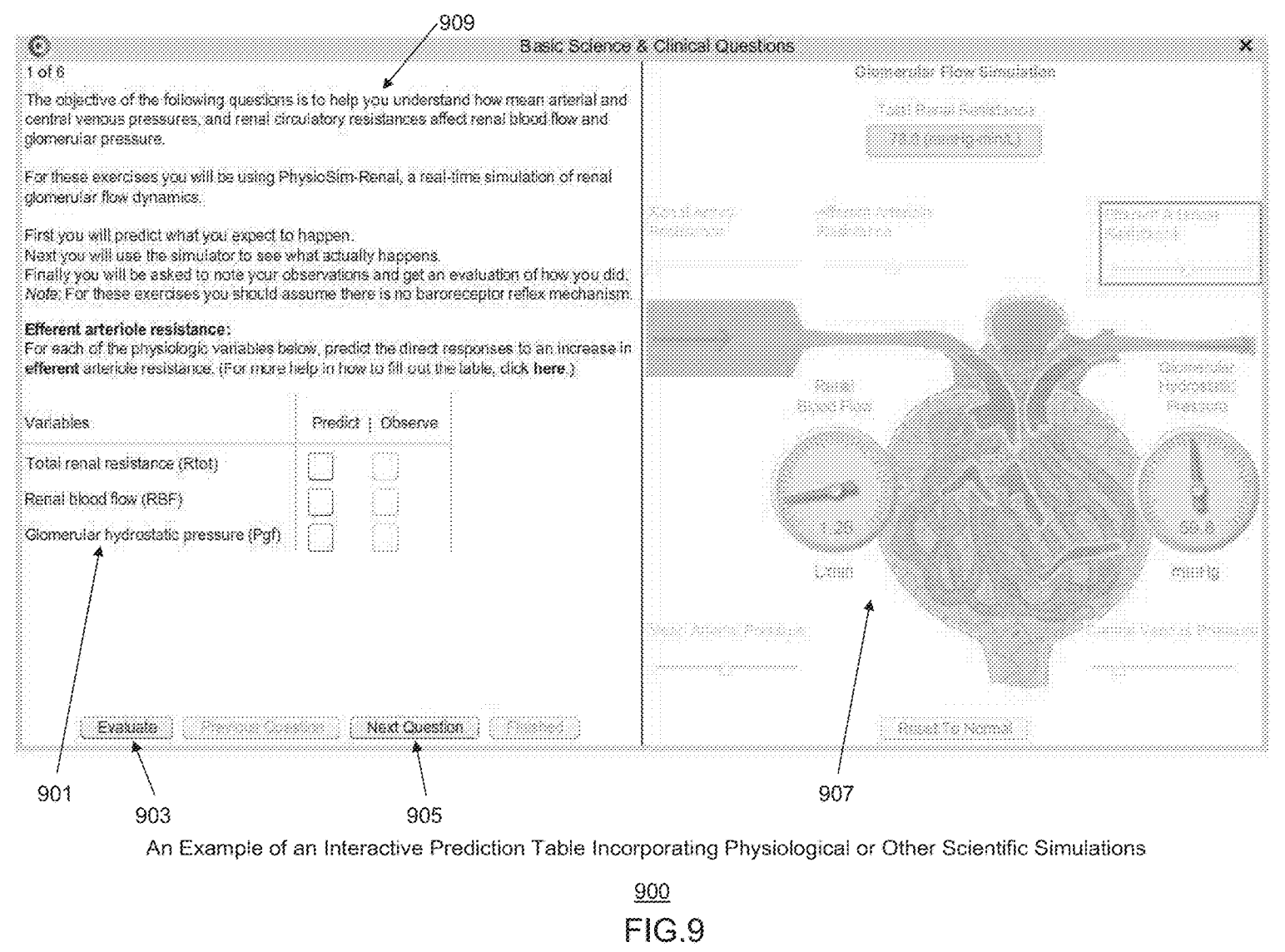

FIG. 9 shows an example (900) of an interactive prediction table (901) incorporating physiological or other scientific simulations, in accordance with an embodiment of the invention. In this embodiment of the invention, a prediction table instruction (909) informs a user (e.g. a medical student, a trainee, a healthcare professional, and etc.) what the objective of the current prediction table exercise is, and explains in more detail what the user is supposed to predict in the interactive prediction table (901). Furthermore, a physiological or other scientific simulation window (907) is situated next to the prediction table instruction (909) and the interactive prediction table (901), as shown in the example (900) in FIG. 9.

The prediction table instruction (909) in this example (900) states that the objective of the exercise listed in the prediction table instruction (909) is to help the user understand how mean arterial and central venous pressures and renal circulatory resistances affect renal blood flow and glomerular pressure. The prediction table instruction (909) also states that a real-time simulation of renal glomerular flow dynamics will be utilized to enable the user compare his or her predictions indicated in the interactive prediction table (901) with observable simulations of the renal glomerular flow dynamics. Furthermore, in the example (900) shown in FIG. 9, the prediction table instruction (909) specifically instructs the user to predict the direct responses to an increase in efferent arteriole resistance.

As shown in the interactive prediction table (901), the user is instructed to predict whether the total renal resistance (Rtot), renal blood flow (RBF), and Glomerular hydrostatic pressure (Pgf) are going to increase or decrease as direct responses to an increase in efferent arteriole resistance. In one embodiment of the invention, by utilizing a pointer and a mouse connected to a computer system that generates the interactive prediction table (901), the user can indicate his or her predictions regarding the three variables (i.e. Rtot, RBF, and Pgf). In another embodiment of the invention, the user can select and indicate his or her predictions on the interactive prediction table (901) displayed on a touch screen.

Furthermore, the "evaluate" button (903), when selected by the user, prompts the healthcare education software to compare the user's entered predictions in the interactive prediction table (901) with observed results, which involve computerized physiological or other scientific simulations displayed in the physiological or other scientific simulation window (907). In addition, the "next question" button (905), when selected by the user, invokes the healthcare education software to move on to a different question from the current question associated with the prediction table instruction (909).

Figure 10:
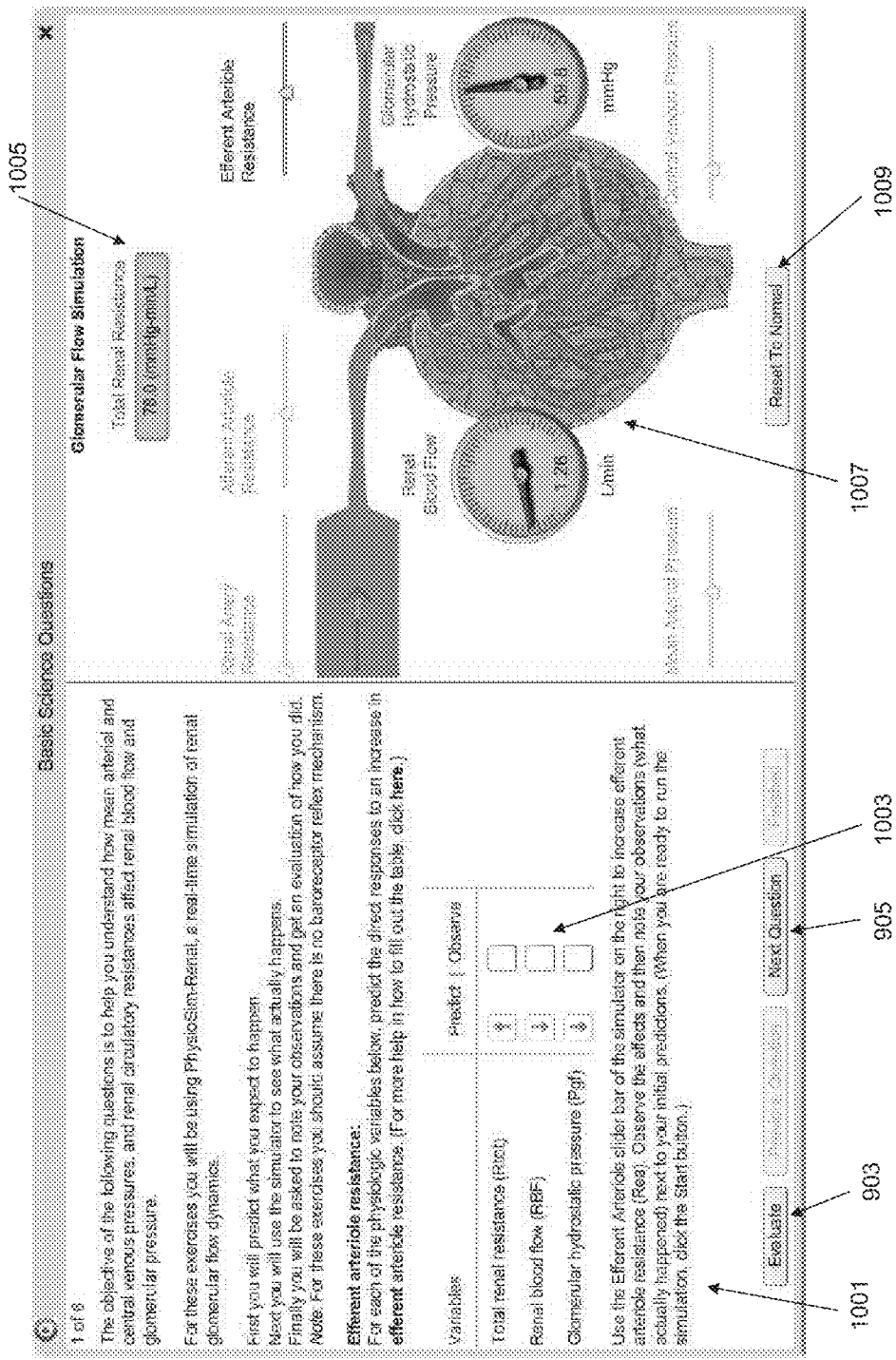
FIG. 10 shows an example of an interactive prediction table with user entry of prediction before physiological or other scientific simulations, in accordance with an embodiment of the invention.

FIG. 10 shows an example (1000) of an interactive prediction table (1003) with user entry of prediction before a physiological or other scientific simulation, in accordance with an embodiment of the invention. In this example (1000), the user has entered an "up" arrow for the total renal resistance (Rtot), and "down" arrows for the renal blood flow (RBF) and the Glomerular hydrostatic pressure (Pgf) in the interactive prediction table (1003). A down arrow is the user's prediction of a decrease in value for a particular variable during the physiological or other scientific simulation. An up arrow, on the other hand, is the user's prediction of an increase in value for a particular variable during the physiological or other scientific simulation. In one embodiment of the invention, the user may also enter a flat line symbol to the interactive prediction table (1003) to predict "no change" to a particular variable through the physiological or other scientific simulation.

The observable values in the interactive prediction table (1003) are not yet displayed in FIG. 10, as the physiological or other scientific simulation (e.g. glomerular flow simulation) has not yet been initiated by the user. As shown in FIG. 10, a simulator instruction (1001) in this example (1000) indicates how the user can perform the glomerular flow simulation, and describes what the user is supposed to observe. When the user selects the start button to initiate the glomerular flow simulation, a physiologically-simulated object (1007) becomes animated, and a simulation value readout (1005) shows the total renal resistance value (e.g. 78.0 mmHg-min/L) in real time, while the renal blood flow gauge and the glomerular hydrostatic pressure gauge also show their readings (e.g. 1.26 L/min, 59.8 mmHg) in real time.

During the physiological or other scientific simulation, the user can also select "Reset to Normal" button (1009) to reset or initialize the simulated animation sequence. Furthermore, the user can also select a time slide bar associated with the renal artery resistance, afferent arteriole resistance, or efferent arteriole resistance to rewind or forward to a particular animation sequence for the physiological or other scientific simulation.

As shown by the example (1000) in FIG. 10, the physiological or other scientific simulation is a computer-generated and user-configurable graphical simulation of an observable physiological phenomenon or an observable physiological effect after a hypothetical condition or a hypothetical treatment is applied to a virtual patient or to a particular body part of the virtual patient. The glomerular flow simulation shown in FIG. 10 is merely one of many possible physiological or other scientific simulations that can be provided by the healthcare education software, which is executed on a CPU and a memory unit of a computer system or another electronic device. Other examples of physiological or other scientific simulations include, but are not limited to, human cardiovascular hemodynamics, pulmonary mechanics, gas diffusion and transport, multi-compartment body fluid and electrolyte exchanges, and the renal system.

Figure 11:
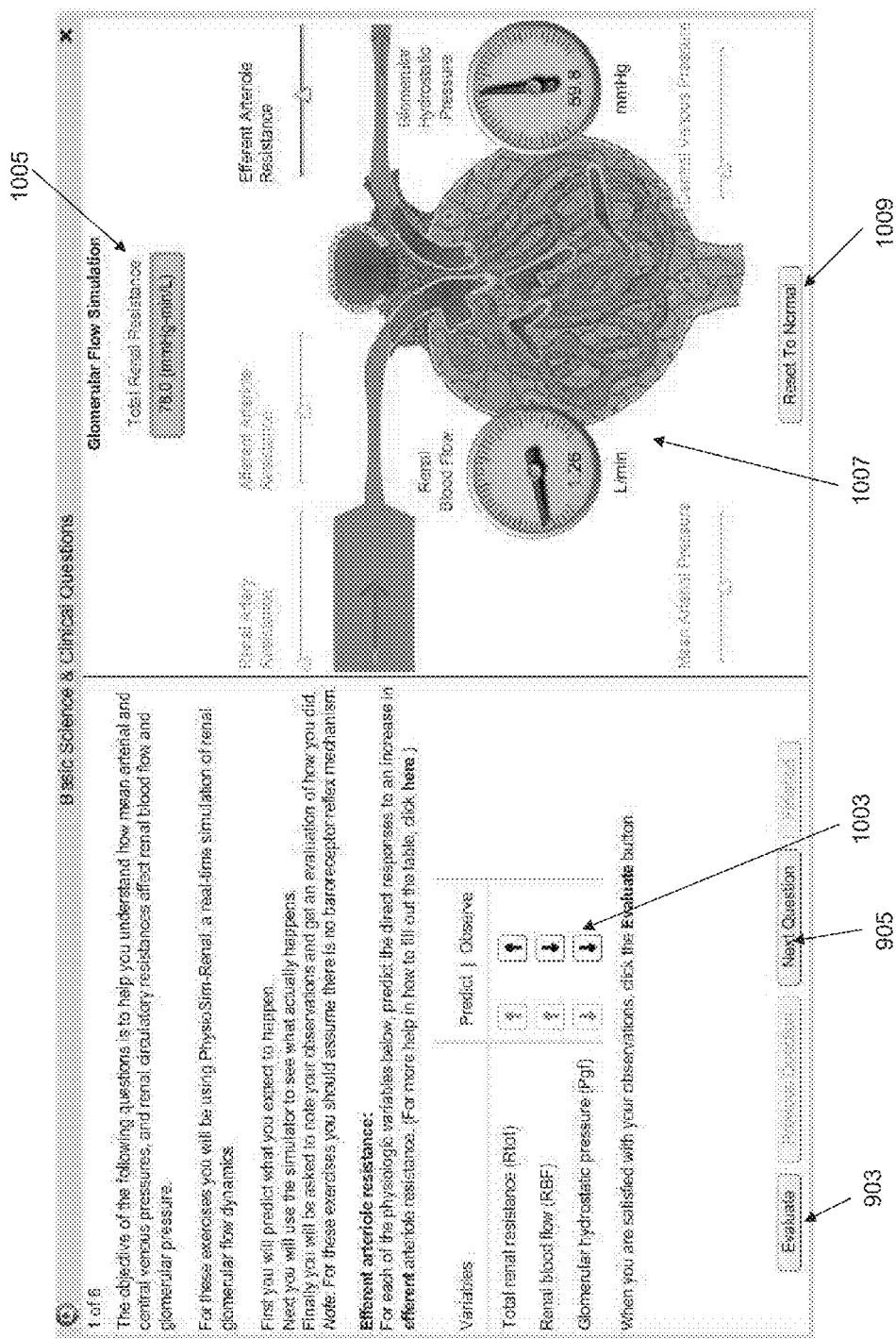
FIG. 11 shows an example of physiological or other scientific simulation with interactive prediction table in observation mode, in accordance with an embodiment of the invention.

FIG. 11 shows an example (1100) of physiological or other scientific simulation with interactive prediction table (1003) in observation mode, in accordance with an embodiment of the invention. The physiological or other scientific simulation in observation mode generates observed values from the animation sequences of the physiological or other scientific simulation. In this example (1100), the glomerular flow simulation generates three observed values that can be compared against the user's predicted values in the interactive prediction table (1003). As shown in FIG. 11, the total renal resistance (Rtot) is observed to go up with an "up" arrow, while the renal blood flow (RBF) and the glomerular hydrostatic pressure (Pgf) values are observed to go down with "down" arrows. In case of the total renal resistance (Rtot) and the glomerular hydrostatic pressure (Pgf), the user's predictions are in agreement with the observed values. In case of the renal blood flow (RBF), the user's prediction, which indicated an increase with an "up" arrow, contradicts the observed result of the decreased renal blood flow.

In a preferred embodiment of the invention, the observed results may be automatically placed into the corresponding arrow indicator spots in the interactive prediction table (1003), after the physiological or other scientific simulation is completed. In an alternate embodiment of the invention, the observed results may be manually placed into the corresponding arrow indicator spots in the interactive prediction table (1003) by the user as part of the educational and training experience. In the alternate embodiment of the invention, the user has a chance of making an incorrect observation for manually recording the observed results in the interactive prediction table (1003). For medical training purposes, the healthcare education software in accordance with an embodiment of the invention is configured to evaluate the correctness of the user's prediction values as well as the user's observed result entries.

Figure 12:
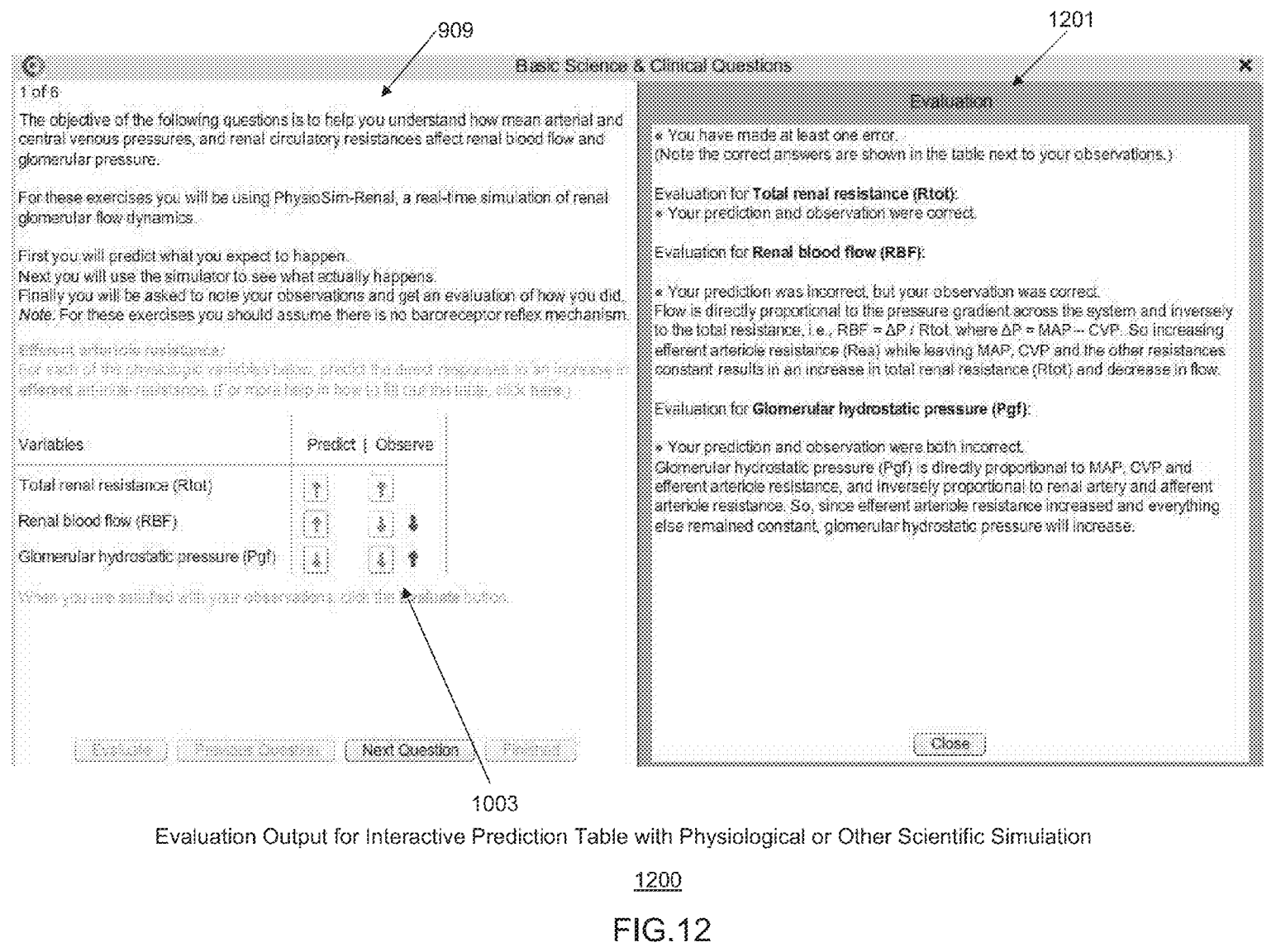

FIG. 12 shows an evaluation output (1201) for interactive prediction table with physiological or other scientific simulation, in accordance with an embodiment of the invention. As shown in an evaluation output screenshot (1200), once the "evaluate" button (e.g. 903 in FIG. 9) is selected, the healthcare education software provides the evaluation output (1201), which describes correctness of the user's prediction values and observation values.

In this particular example, as shown in the evaluation output screenshot (1200), the user has made a correct prediction and a correct observation for the total renal resistance (Rtot). However, the user has made an incorrect prediction and a correct observation for the renal blood flow (RBF). Furthermore, the user also made an incorrect prediction and an incorrect observation for the glomerular hydrostatic pressure (Pgf).

As shown in FIGS. 9-12 and described in corresponding paragraphs of the specification, the interactive prediction table (1003), the physiological or other scientific simulation associated with the interactive prediction table (1003), and the evaluation output (1201) with detailed answers for showing correctness of the user's entries into the interactive prediction table (1003) provide the user an effective and novel e-learning method, which is not available in conventional healthcare education products. By utilizing the novel interactive prediction table, an embodiment of the present invention provides a unique interactive healthcare education environment in which the user can apply his or her medical knowledge and clinical understanding to make predictions, to observe and record outputs from physiological or other scientific simulations, and to compare against expert answers at a computerized evaluation stage.

Figure 13:
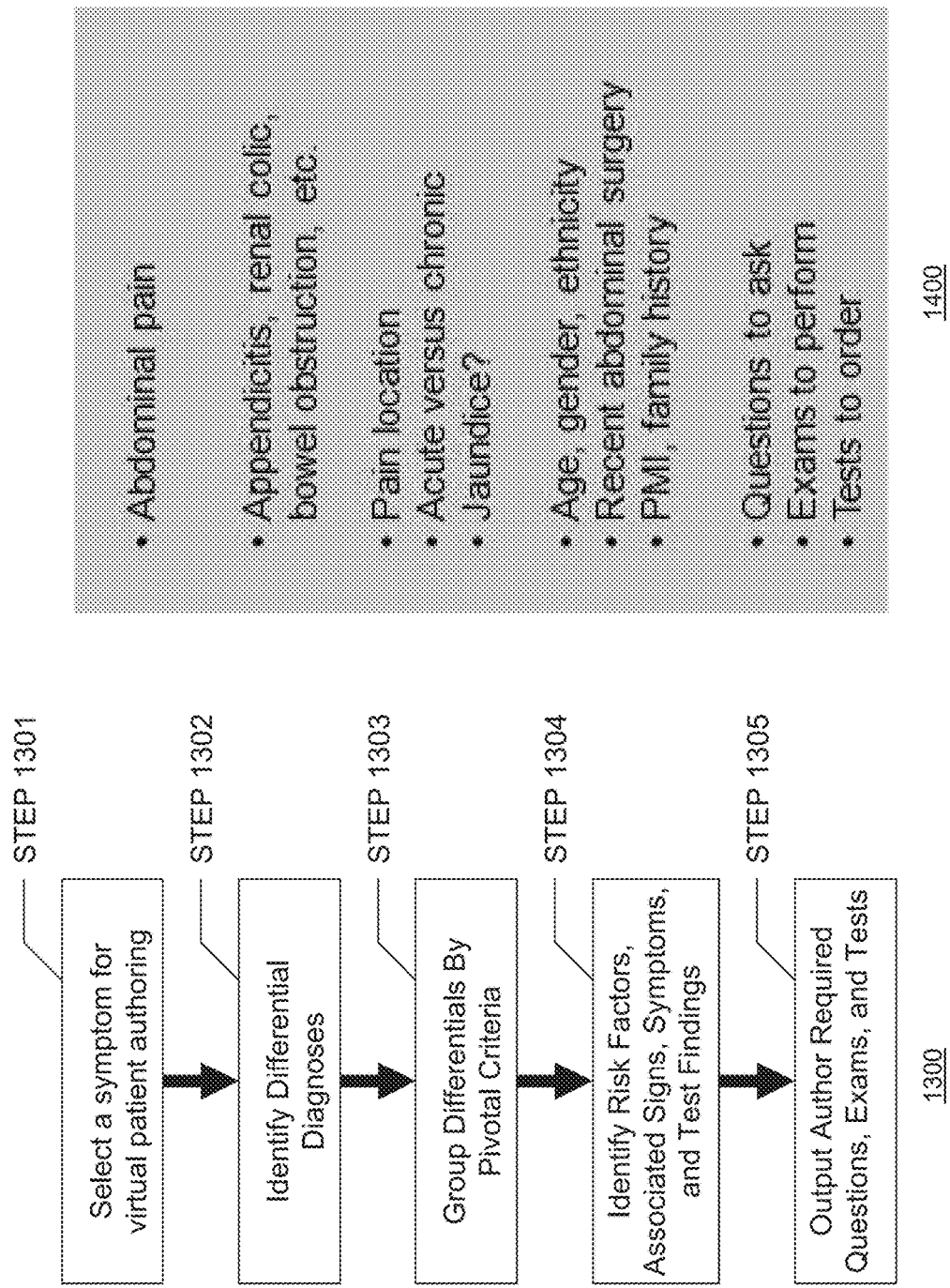
FIG. 13 shows an evidence-based virtual patient authoring method for electronic healthcare education, in accordance with an embodiment of the invention.

FIG. 13 shows an evidence-based virtual patient authoring method (1300) for electronic healthcare education, and an example (1400) of utilizing the evidence-based virtual patient authoring method (1300), in accordance with an embodiment of the invention.

As shown in STEP 1301, a healthcare education content creator (e.g. a medical educator, a medical expert, an academic instructor, and etc.) can select a symptom of educational interest for virtual patient authoring from a medical authoring interface. For example, the symptom of educational interest may be "abdominal pain," as shown in the example (1400). In a preferred embodiment of the invention, a multiple number of medical authoring interfaces may be integrated into a healthcare education software. An example of a medical authoring interface is a medical causal concept diagram authoring interface, which has been previously described in conjunction with FIG. 7 and FIG. 8 in the specification.

The healthcare education content creator can then identify and list differential diagnosis for the symptom of educational interest, as shown in STEP 1302. In case of the abdominal pain example (1400), a list of differential diagnosis may include appendicitis, renal colic, bowel obstruction, and other potentially-related conditions. Subsequently, the identified differential diagnoses can be grouped by pivotal criteria, such as pain location, acute vs. chronic nature of the symptom, and visible signs of abnormalities, as shown in STEP 1303.

Then, patient-specific risk factors, associated signs, symptoms, and test findings can be identified for the symptom of educational interest by the healthcare education content creator, as shown in STEP 1304. In one example, some of the patient-specific risk factors, associated signs, symptoms, and test findings include, but are not limited to, the patient's age, gender, ethnicity, recent surgeries, and family history. The healthcare education content creator can then create questions, exams, and tests by utilizing at least one of the medical authoring interfaces that are incorporated in the healthcare education software embodied by the present invention, as shown in STEP 1305.

Preferably, the medical authoring interface is a GUI-based software module in the healthcare education software, which does not require the healthcare education content creator to understand or modify underlying computer programming codes for creating and updating healthcare training and physiological simulation animation contents. Furthermore, in a preferred embodiment of the invention, the medical authoring interface is operatively connected to a medical information database that contains a wealth of physiological or other scientific simulation animation files, evidence-based patient diagnostic information, and other medical information, at least some of which the healthcare education content creator can readily import and utilize in creating and updating medical training contents with the medical authoring interface.

Various embodiments of the invention of have been described above and also illustrated in part by FIGS. 1-13. The present invention provides several advantages over conventional medical training methods. First, an embodiment of the present invention provides a novel and intuitive medical content authoring software platform that a medical expert or a medical instructor can readily utilize to configure, provide, and update computerized medical training and evaluation contents to medical students and trainees.

Furthermore, an embodiment of the present invention uniquely provides a novel and versatile medical training, simulation, and evaluation software platform that coherently integrates healthcare education-specific needs in student training and evaluation. In addition, an embodiment of the present invention uniquely provides a medical training software platform that incorporates computerized medical causal concept diagram construction and evaluation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electronic healthcare education system comprising:
a virtual patient examination simulator interface module that renders a computer graphics animation of a virtual physical exam diagnostic device and a real-time motory change to an organ or a body part of an animated virtual patient when a user's diagnostic gesture pattern is drawn with a mouse on top of the animated virtual patient on a display screen, wherein the virtual patient examination simulator interface prompts the user to specify diagnostic prediction indicators for a diagnostics result before invoking the user's diagnostic gesture pattern to initiate a diagnostics test and determine correctness of the user's diagnostic prediction indicators, wherein the real-time motory change to the organ or the body part and the diagnostics test are associated with an ocular motor examination, and wherein the user's diagnostic gesture pattern drawn on top of the animated virtual patient is an "H" pattern gestured over the animated virtual patient's eyes with the mouse;
a medical authoring interface module, which includes graphical user interface tools that allow a healthcare education content creator to create and update a medical training content, without direct modification of underlying computer programming codes by the healthcare education content creator;
a medical information database, which contains physiological simulation animation files and evidence-based patient diagnostic information that are periodically updated by one or more medical experts, wherein at least some information from the medical information database is dynamically linkable or importable to the medical training content, which is being composed by the medical authoring interface module and the healthcare education content creator; and
a central processing unit (CPU) and a memory unit of a computer system or another electronic device, wherein the CPU and the memory unit execute at least one of the virtual patient examination simulator interface module, the medical authoring interface module, and the medical information database.

2. The electronic healthcare education system of claim 1, further comprising an interactive prediction table module for providing an e-learning environment for a structured scientific experiment that allows the user to enter predictions and hypothesis first, after which the structured scientific experiment is executed to display experimental outcomes that are compared against the predictions and the hypothesis previously entered by the user.

3. The electronic healthcare education system of claim 2, wherein the interactive prediction table module generates and displays an interactive prediction table with a set of variables, a prediction entry section by the user for the set of variables, and a scientific simulation observation entry section by the user for the set of variables, wherein the prediction entry section and the scientific simulation observation entry section are evaluated and compared against expert answers upon selection of an "evaluate" button.

4. The electronic healthcare education system of claim 1, further comprising a medical causal concept diagram construction module, wherein the medical causal concept diagram construction module generates and displays one or more selected and active causal concept blocks, which are movable by the user on the display screen and are also linkable by directional arrows to indicate causal relationships, directly-proportional relationships, or inversely-proportional relationships among the one or more selected and active causal concept blocks.

5. The electronic healthcare education system of claim 1, further comprising a medical causal concept diagram evaluation module, wherein the medical causal concept diagram evaluation module records a user-created medical causal concept diagram in the memory unit or another data storage, and compares against an expert diagram and expert answers when the user invokes evaluation of the user-created medical causal concept diagram.

6. The electronic healthcare education system of claim 1, further comprising a physiological simulation module, which generates and displays at least one of a graphical sequence of a physiological simulation and simulated readout values for medical instruments.

7. The electronic healthcare education system of claim 6, wherein the physiological simulation module generates and displays at least one of the graphical sequence of the physiological simulation and the simulated readout values as part of a student exercise question with an interactive prediction table with a set of variables, a prediction entry section by the user for the set of variables, and a physiological simulation observation entry section by the user for the set of variables.

8. The electronic healthcare education system of claim 6, wherein the graphical sequence of the physiological simulation is related to human cardiovascular hemodynamics, pulmonary mechanics, gas diffusion and transport, multi-compartment body fluid and electrolyte exchanges, and the renal system.

9. The electronic healthcare education system of claim 1, wherein the virtual patient examination simulator interface module further includes a link to a virtual patient record and a student case assessment panel that allows a student to organize findings and problems, conduct differential diagnosis, and order virtual medical tests associated with the animated virtual patient.

10. The electronic healthcare education system of claim 9, wherein the virtual patient examination simulator interface module further includes a test result panel that shows an outcome of the virtual medical tests, a diagnosis notepad panel where the student writes his or her diagnosis associated with the animated virtual patient, a treatment and management plan panel that includes the student's treatment and managed care plans for the animated virtual patient, and a summary panel that summarizes activities associated with the student and the animated virtual patient.

11. The electronic healthcare education system of claim 1, wherein the virtual physical exam diagnostic device is a sphygmomanometer.

* * * * *